United States Patent
Mauti et al.

(10) Patent No.: US 6,220,025 B1
(45) Date of Patent: Apr. 24, 2001

(54) STATOR FOR TORQUE CONVERTER

(75) Inventors: Renato Mauti, Farmington Hills; Darrin C. Raley, Madison Heights, both of MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/264,200

(22) Filed: Mar. 8, 1999

(51) Int. Cl.[7] ................................................ F16D 33/00
(52) U.S. Cl. ..................... 60/362; 60/365; 416/197 C; 416/180; 416/143
(58) Field of Search ........................... 60/342, 354, 361, 60/362, 365, 366, 367; 416/143, 180, 197 C

(56) References Cited

U.S. PATENT DOCUMENTS

| | | | |
|---|---|---|---|
| 3,852,955 | * 12/1974 | Wonn et al. | 60/341 |
| 4,009,571 | 3/1977 | Black et al. | 60/354 |
| 4,012,908 | 3/1977 | Dundore | 60/354 |
| 5,263,319 | 11/1993 | By et al. | 60/342 |
| 5,307,629 | * 5/1994 | By et al. | 60/342 |

* cited by examiner

Primary Examiner—Edward K. Look
Assistant Examiner—Thomas E. Lazo
(74) Attorney, Agent, or Firm—Kenneth H. MacLean

(57) ABSTRACT

A torque converter is provided with a stator assembly having a nonrotatable body portion and a plurality of blades pivotally attached to the body portion. The plurality of blades are pivotable between a first position for providing torque multiplication and a second position out of the fluid flow.

17 Claims, 6 Drawing Sheets

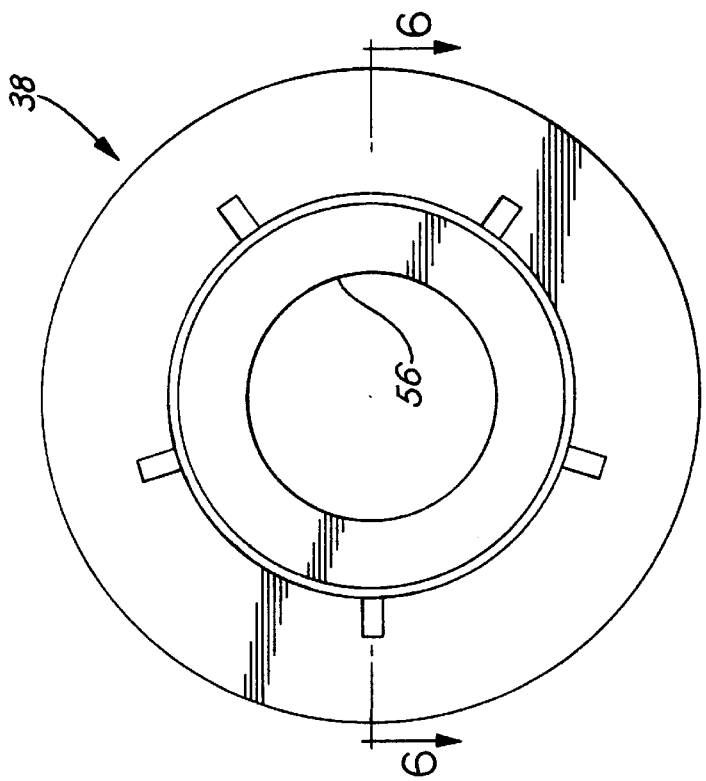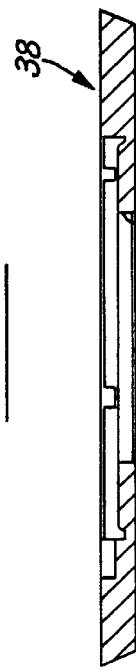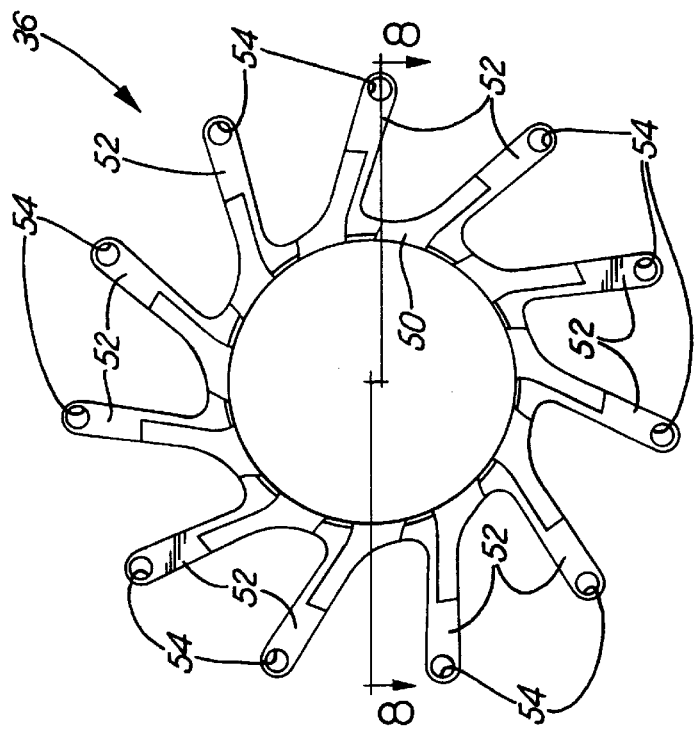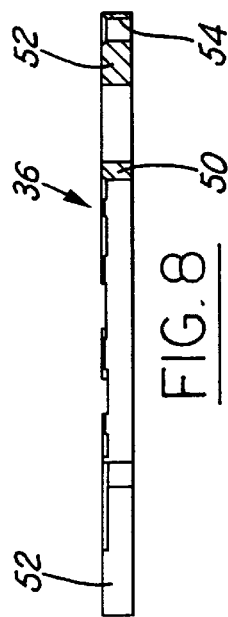

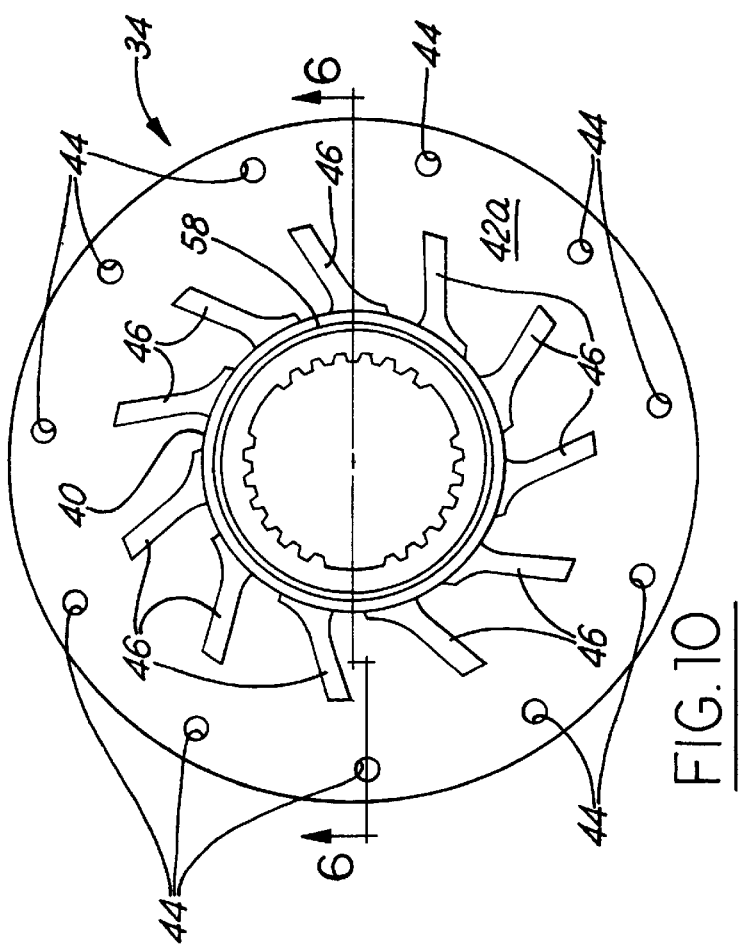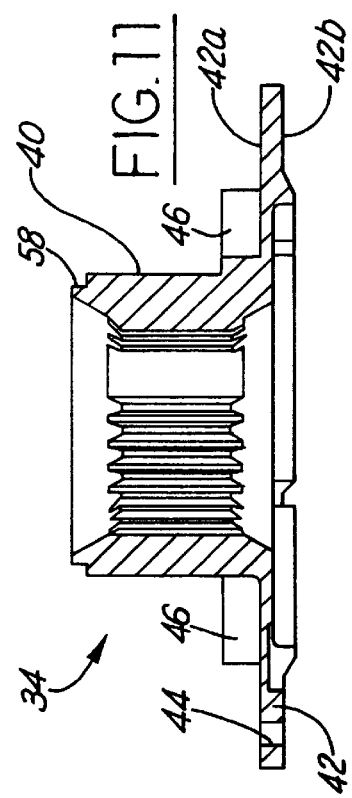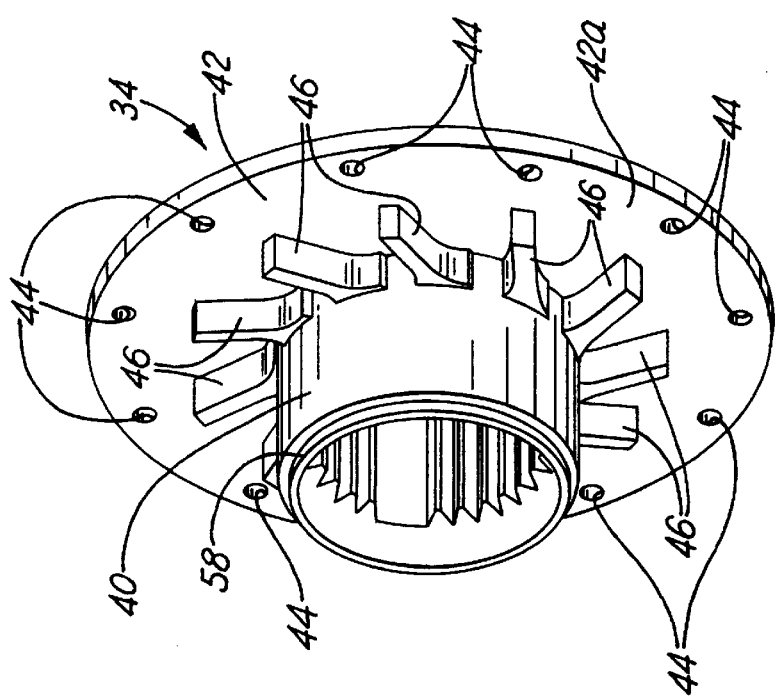

1

STATOR FOR TORQUE CONVERTER

BACKGROUND OF THE INVENTION

Field of the Invention

The present invention relates generally to torque converters, and more particularly to a stator that includes blades which fold open to multiply the torque in the torque converter and which fold inward out of the fluid flow when a sufficient speed ratio between the impeller and turbine is achieved.

BACKGROUND AND SUMMARY OF THE INVENTION

A torque converter contains three parts: an impeller turned by the engine flywheel; a turbine that turns the input shaft of the automatic transmission; and a stator which is disposed between the impeller and the turbine. The torque converter is filled with oil which is moved by the impeller blades. The vanes of the stator deflect this oil from the turbine blades back to the impeller. As the impeller rotates, the speed of the turbine increases to almost match the impeller speed. This provides a fluid coupling between the engine and gear box that smoothes out speed changes. The hydraulic torque converter is an automatically and continuously variable torque converter. The efficiency of a hydraulic torque converter depends intimately on the angles at which the fluid enters and leaves the blades of the impeller, turbine, and stator. Conventional hydraulic torque converters include a stator having an overrunning clutch which, when it is "locked", deflects oil back to the impeller from the turbine, and torque multiplication is achieved. When a sufficient speed ratio between the turbine and impeller is achieved, the overrunning clutch of the stator assembly overruns, and torque multiplication is completed.

With conventional hydraulic torque converters, the impeller, turbine, and stator all require individual balancing since each member rotates at very high speeds. Furthermore, with the conventional stator design, the requirement for an overrunning clutch influences the thickness of the stator assembly. This minimum thickness is a design criteria which can impact the overall size and weight of the torque converter. Finally, the modification of the vane configuration of a conventional stator assembly requires a casting redesign which can be expensive.

The torque converter stator assembly of the present invention is designed to overcome these deficiencies. Specifically, the stator assembly of the present invention includes a body portion and a plurality of blades pivotally mounted to the body portion. The blades pivot between a first radially outwardly extending position for providing torque multiplication, to a retracted annularly extending position out of the fluid flow so that there is limited or no loss due to the blades interfering with the fluid flow. The stator does not include an overrunning clutch. Thus, there is no balancing required since the body of the stator assembly does not rotate. The plurality of blades can be designed with complex profiles in order to obtain various performances. A two-stage torque ratio curve can be obtained by providing two different sets of profiled blades wherein groups of blades can fold independently of others at different speed ratios. The blades of the stator assembly can also be modified very easily and less expensively relative to conventional stator designs.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 5 is a plan view of the end plate of the stator assembly according to the principles of the present invention;

FIG. 6 is a cross-sectional view of the end plate taken along line 6—6 of FIG. 5;

FIG. 7 is a plan view of the post-ring member of the stator assembly according to the principles of the present invention;

FIG. 8 is a cross-sectional view of the post-ring member taken along line 8—8 of FIG. 7;

FIG. 9 is a perspective view of the hub of the stator assembly according to the principles of the present invention;

FIG. 10 is a plan view of the hub of the stator assembly body according to the principles of the present invention;

FIG. 11 is a cross-sectional view of the hub taken along line 11—11 of FIG. 10;

DETAILED DESCRIPTION OF THE PREFERRED EMBODIMENTS

Figure 1:
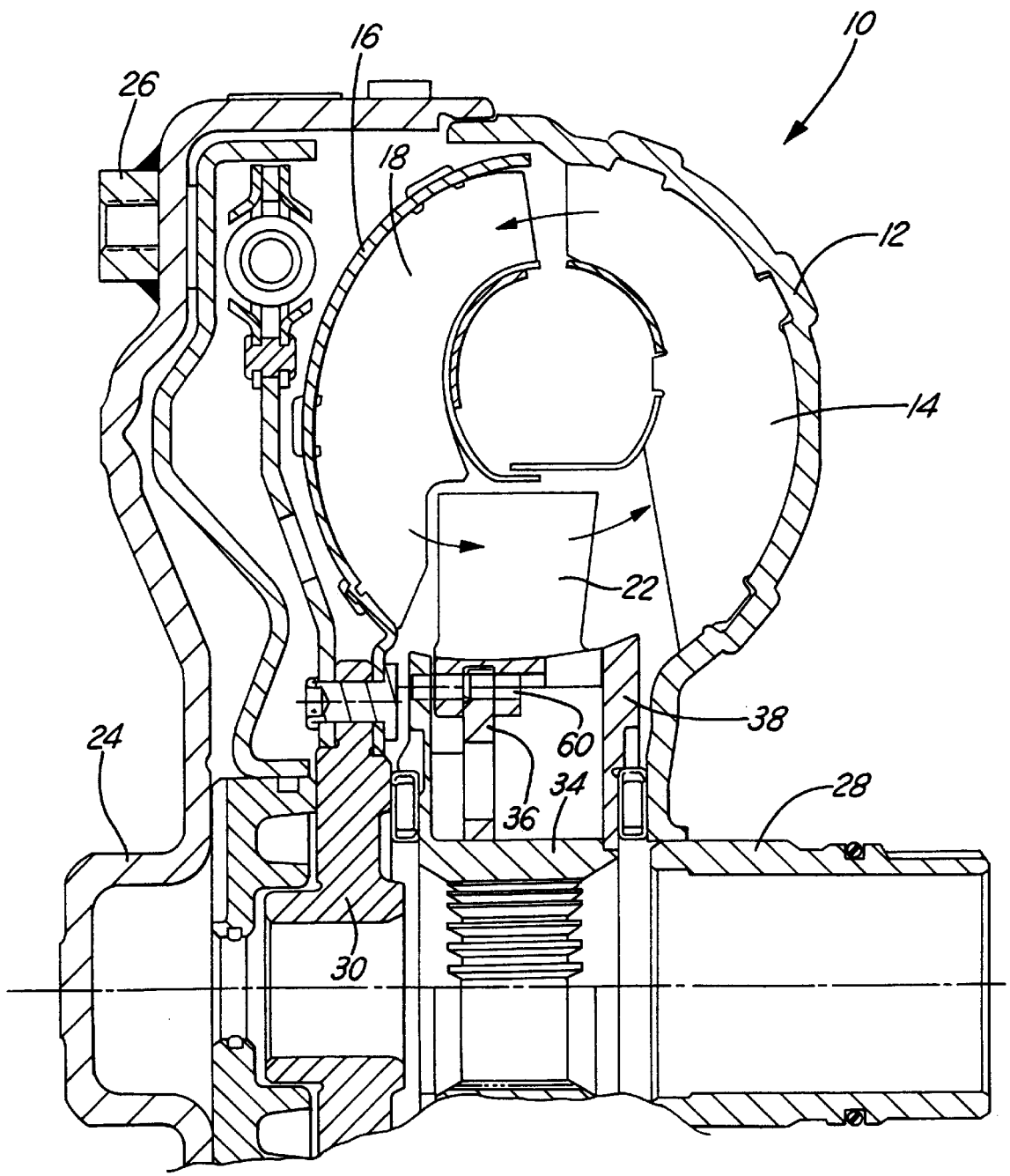
FIG. 1 shows a top half of a sectional view of a torque converter having a stator assembly according to the principles of the present invention.

With reference to FIGS. 1–17, the torque converter stator assembly of the present invention will now be described. The torque converter 10 includes an impeller 12 including a plurality of vane members 14. A turbine 16 is disposed opposite to the impeller 12 and is provided with a plurality of vane members 18. A stator 20 is provided between the impeller 12 and turbine 16 and is provided with a plurality of pivoting blade members 22, as will be described in greater detail herein. The impeller 12 is connected to an input member 24 which has a plurality of threaded members 26 which are secured to a drive plate of an engine (not shown). The impeller 12 is also attached to a drive hub 28 which is in driving engagement with a transmission pump (not shown). The turbine 16 is attached to a drive hub 30 which is attached to a transmission input shaft (not shown).

Figure 2:
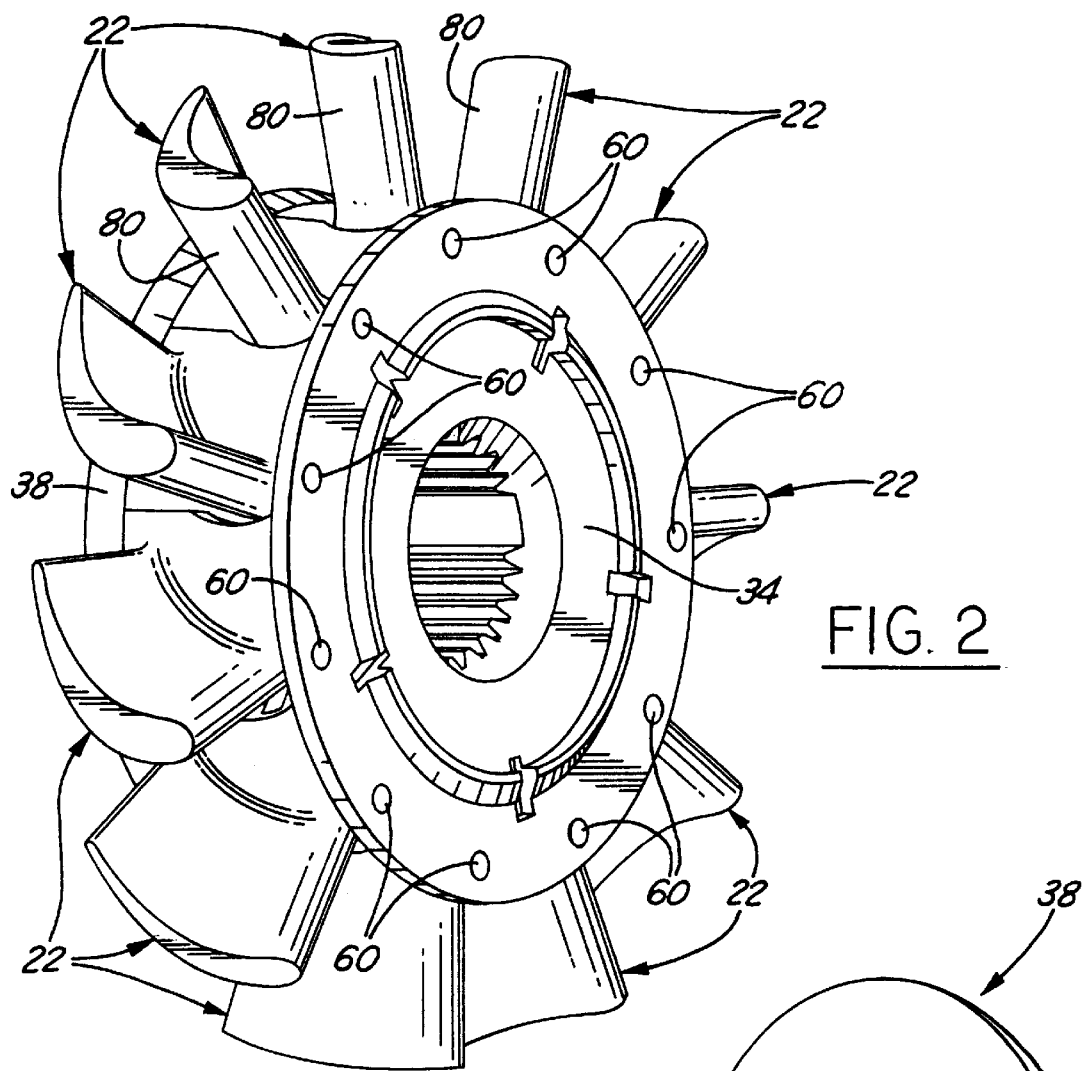
FIG. 2 is a perspective view of the stator assembly according to the principles of the present invention.
Figure 3:
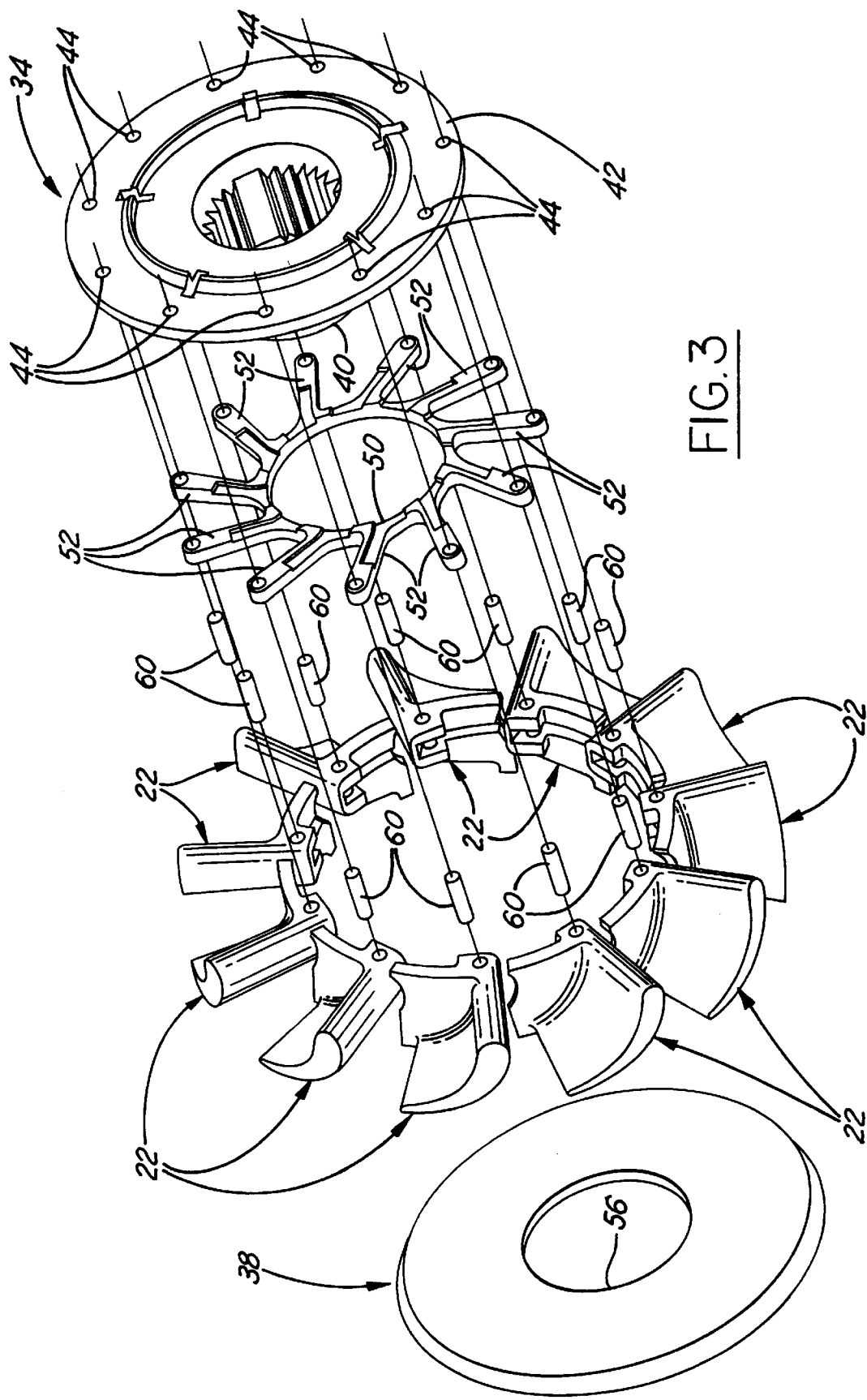
FIG. 3 is an exploded perspective view of the stator assembly according to the principles of the present invention.

With reference to FIGS. 2 and 3, the stator assembly 20, according to the principles of the present invention, will now be described. The stator assembly 20 includes a stator body having a three-piece design including a hub 34, a post-ring member 36, and an end plate 38.

The hub 34, best shown in FIGS. 9–11, includes a cylindrical internally splined hub section 40 and a radially extending flange portion 42. The flange portion 42 includes a plurality of pin holes 44 equally spaced from adjacent holes. The flange portion 42 includes a first face 42a and a second face 42b wherein the hub section 40 extends axially from the first face 42a of flange portion 42. A plurality of generally radially extending support surfaces 46 extend from the first face 42a of flange portion 42 as best shown in FIGS. 8 and 9.

The support surfaces 46 of hub 34 are engaged by recessed portions 48 of post-ring 36. The recessed portions 48 of post-ring 36 complement the shape of the support surfaces 46. The post-ring 36, best shown in FIGS. 7 and 8, includes a central ring portion 50 with a plurality of posts or arms 52 extending radially from the central ring portion 50. The posts 52 are provided with pin holes 54 at an end portion thereof. The post-ring 36 receives the hub section 40 of hub 34 through the central ring portion 50 and the recessed portions 48 engage the support surfaces 46 of the hub 34. The post-ring 36 can be brazed, welded, or attached by other known means to the hub 34.

Figure 4:
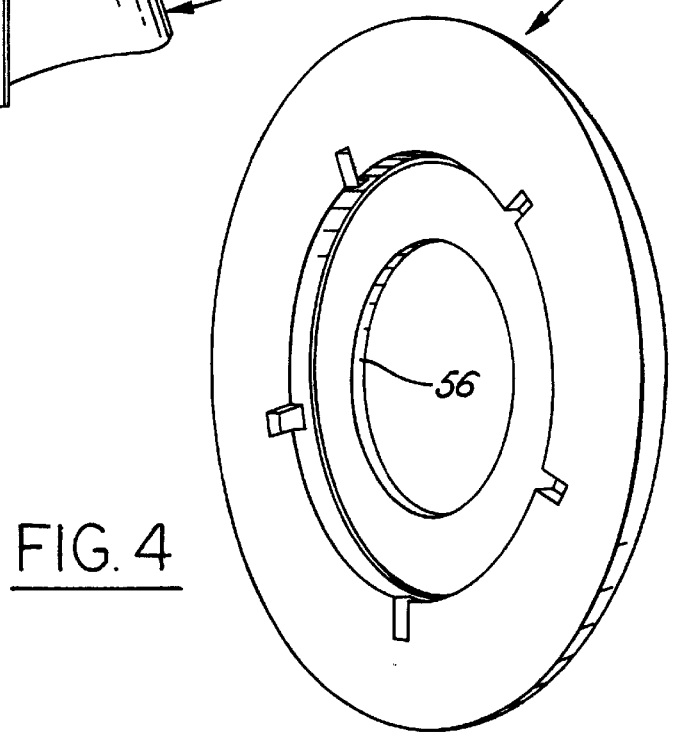
FIG. 4 is a perspective view of the end plate according to the principles of the present invention.

The end plate 38, best shown in FIGS. 4–6, has a central opening 56 which receives a reduced diameter end section 58 of the hub section 40 therein. The end plate 38 is optionally welded or brazed to the hub section 40 of hub 34.

The blades 22 are pivotally attached to the posts 52 of the post-ring 36 by pivot pins 60 which extend through a pair of spaced openings 62 in the blades 22 and through holes 54 in the ends of the post 52 of post-ring 36. The pivot pins 60 also extend through holes 44 provided in the hub 34. Multiple blade designs are shown in FIGS. 12–17 in order to illustrate a few examples of the wide range of configurations which can be utilized with the stator assembly design of the present invention.

Figure 12:
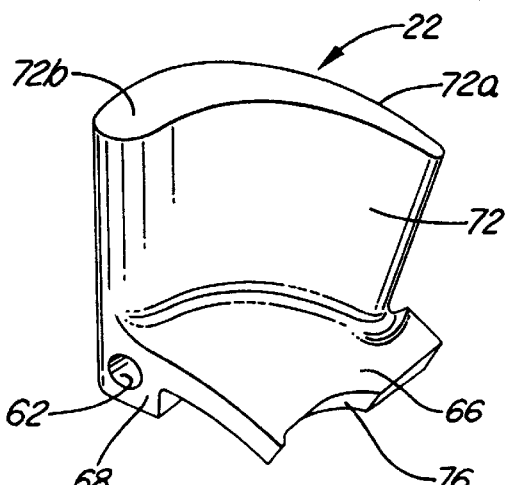
FIG. 12 is an upper perspective view of a blade design according to a first embodiment of the present invention.
Figure 13:
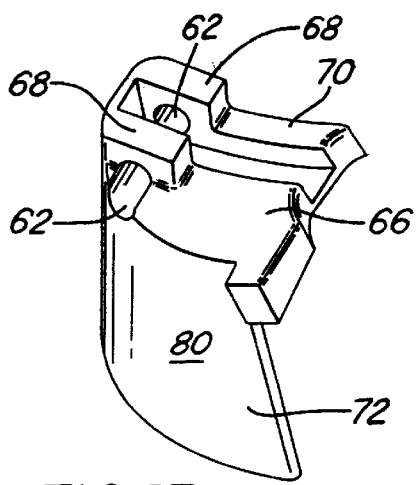
FIG. 13 is a lower perspective view of the blade shown in FIG. 12.
Figure 14:
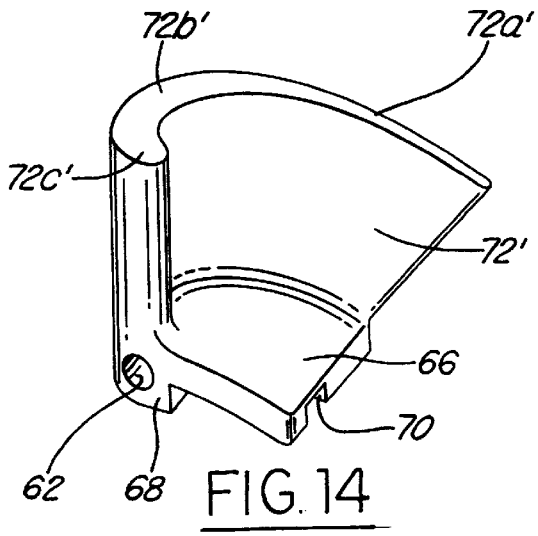
FIG. 14 is an upper perspective view of a blade design according to a second embodiment of the present invention.
Figure 15:
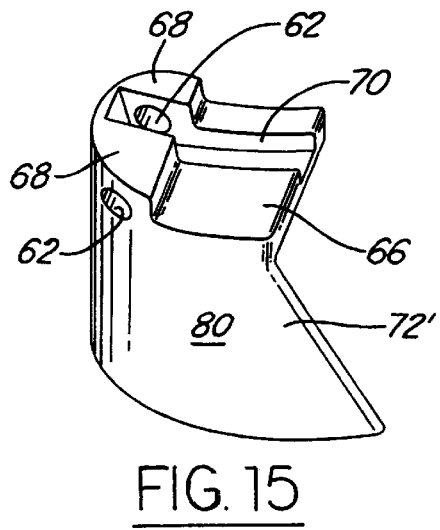
FIG. 15 is a lower perspective view of the blade shown in FIG. 14.
Figure 16:
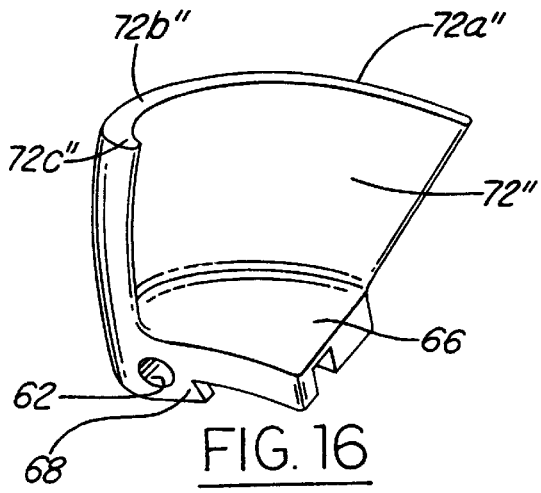
FIG. 16 is an upper perspective view of a blade according to a third embodiment of the present invention.
Figure 17:
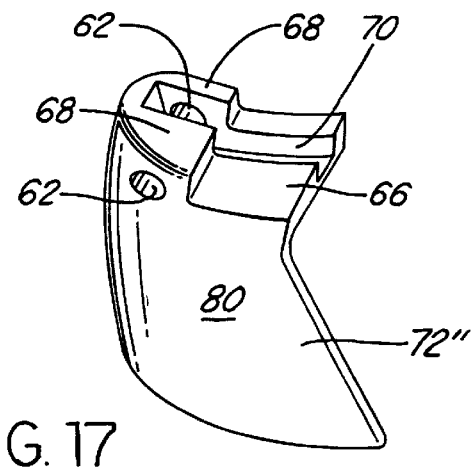
FIG. 17 is a lower perspective view of the blade shown in FIG. 16.

With reference to FIGS. 12–17 wherein like reference numerals are used to designate common features, the blade 22 shown in FIGS. 12 and 13 is provided with a base portion 66 which includes a pair of pivot holes 62 which extend through flange portions 68 which extend from a first side of the base portion 66. A groove 70 is provided in the base portion 66 for receiving a respective post 52 of the post-ring 36. A generally crescent shape wall portion 72 extends generally perpendicularly from the base portion 66. A primary difference between the embodiments shown in FIGS. 12, 13 and FIGS. 14–17, is that the shape of the wall portion 72, 72', 72" is varied. In particular, the crescent-shaped wall portion 72 of the blade 22 shown in FIGS. 12 and 13 includes a curved wall portion having a first section extending generally longitudinally and a second section 72b extending generally laterally when the blades are in the first radially outwardly extending position. The embodiments shown in FIGS. 14–17 show generally crescent-shaped wall portions 72' and 72" wherein the wall portion 72' and 72" are provided with a second laterally extending wall section 72c', 72c". The blade 22 shown in FIGS. 12 and 13 also includes a recessed portion 76 provided in the base portion 66. The recessed portion 76 receivingly accommodates a generally crescent-shaped wall portion of an adjacent blade when the blades are in the first radially outwardly extending position, as shown in FIG. 2.

The stator 20 of the present invention does not utilize an overrunning clutch as is typically used in the conventional art. The stator body (34, 36, 38) is fixedly attached to a stator reaction shaft (not shown) and does not rotate in the torque converter. Therefore, there are no balancing measures required for the stator design of the present invention. The stator 20 of the present invention operates the same as conventional stators with one exception. As the pressure angles change with the speed ratio between the impeller and turbine, and the stator is no longer needed, the blades rotate inward out of the fluid flow so that limited or no shock losses due to the blades 22 are experienced. The outer surface 80 of the blades 22 combine to define an annular surface over which the torque converter fluid passes with minimal resistance.

With the stator design of the present invention, a two-stage torque ratio curve can be obtained by providing two different sets of profiled blades. The groups of blades fold independently of others wherein a first set of blades is designed to fold at a first speed ratio, and the second set of blades is designed to fold at a second speed ratio. Furthermore, various performance levels can be obtained by altering the shapes of blades such as shown in FIGS. 12–17 and/or by leaving blades out. Furthermore, during a torque converter design change, the stator configuration can be modified simply by modifying the configuration of the blades 22. This results in a great costs savings to the manufacturer since complete retooling is not required.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A stator assembly for use with a torque converter, comprising:
   a body portion; and
   a plurality of blades pivotally mounted to said body portion, said blades being pivotable from a first radially outwardly extending position to a retracted annularly extending position.

2. The stator assembly according to claim 1, wherein said plurality of blades are each pivotally mounted to said body portion by a plurality of pins which are mounted to the body portion, each of said plurality of pins extending parallel to one another in a longitudinal direction.

3. The stator assembly according to claim 1, wherein each of said plurality of blades pivot about parallel axes.

4. The stator assembly according to claim 1, wherein each of said plurality of blades includes a generally crescent shaped wall portion including a generally longitudinally extending wall section and a generally laterally extending wall section when said blades are in said first radially outwardly extending position.

5. The stator assembly according to claim 1, wherein each of said plurality of blades includes a base portion defining a pivot point for said blades and a generally crescent shaped wall portion extending generally perpendicularly from said base portion.

6. The stator assembly according to claim 5, wherein said generally crescent shaped wall portion includes a generally longitudinally extending wall section and a generally laterally extending wall section when said blades are in said first radially outwardly extending position.

7. The stator assembly according to claim 5, wherein said base portion of each of said plurality of blades extend in an annular direction when said plurality of blades are in said first radially outwardly extending position and said base portion of each of said plurality of blades includes an edge portion having a recess for receivingly accommodating a generally crescent shaped wall portion of an adjacent blade when said blades are in said first radially outwardly extending position.

8. The stator assembly according to claim 1, wherein said body portion includes a hub member including an internally splined hub portion and a radially extending flange portion extending from said hub portion, a post ring member is provided in overlapping engagement with a face of said radially extending flange portion, said radially extending flange of said hub member and said post ring member each including a plurality of equally spaced holes which align with respective holes on each other for receiving a pivot pin for supporting said plurality of blades.

9. A torque converter, comprising:

an impeller adapted to be driven by an engine;

a turbine for delivering torque from said torque converter in response to fluid flow from said impeller; and a stator for redirecting the fluid flow from said turbine to said impeller including a body portion and a plurality of blades pivotally mounted to said body portion, said blades being pivotable about a longitudinal axis from a first radially outwardly extending position to a retracted annularly extending position.

10. The torque converter according to claim 9, wherein said plurality of blades are each pivotally mounted to said body portion by a plurality of pins which are mounted to the body portion, each of said plurality of pins extending parallel to one another in a longitudinal direction.

11. The torque converter according to claim 9, wherein each of said plurality of blades pivot about parallel axes.

12. The torque converter according to claim 9, wherein each of said plurality of blades includes a generally crescent shaped wall portion including a generally longitudinally extending wall section and a generally laterally extending wall section when said blades are in said first radially outwardly extending position.

13. The torque converter according to claim 9, wherein each of said plurality of blades includes a base portion defining a pivot point for said blades and a generally crescent shaped wall portion extending generally perpendicularly from said base portion.

14. The torque converter according to claim 13, wherein said generally crescent shaped wall portion includes a generally longitudinally extending wall section and a generally laterally extending wall section when said blades are in said first radially outwardly extending position.

15. The torque converter according to claim 13, wherein said base portion of each of said plurality of blades extend in an annular direction when said plurality of blades are in said first radially outwardly extending position and said base portion of each of said plurality of blades includes an edge portion having a recess for receivingly accommodating a generally crescent shaped wall portion of an adjacent blade when said blades are in said first radially outwardly extending position.

16. The torque converter according to claim 9, wherein said body portion includes a hub member including an internally splined hub portion and a radially extending flange portion extending from said hub portion, a post ring member is provided in overlapping engagement with a face of said radially extending flange portion, said radially extending flange of said hub member and said post ring member each including a plurality of equally spaced holes which align with respective holes on each other for receiving a pivot pin for supporting said plurality of blades.

17. The torque converter according to claim 9, wherein said stator body is nonrotatably disposed within said torque converter.

* * * * *